3,068,056
DYEING OF POLYESTER FIBER AND THE PRODUCTS SO OBTAINED
David Gordon Coe, Mendenhall, Pa., assignor to E. I. du Pont de Nemours and Company, Wilmington, Del., a corporation of Delaware
No Drawing. Filed June 2, 1960, Ser. No. 33,390
5 Claims. (Cl. 8—41)

This invention relates to a process of dyeing acid-modified polyester fiber and to the dyed fabric thus obtained. It is an object of this invention to provide a process for achieving strong dyeings on the mentioned fiber in shades ranging from green through blue to violet.

By acid-modified polyester fiber I mean polyethylene terephthalate fiber containing metal-sulfonate groups, as described more fully in British Patent No. 826,248, accepted December 31, 1959, and corresponding in part to U.S. Patent No. 3,018,272, issued January 23, 1962. As in the case of other highly hydrophobic synthetic fibers, it has been difficult hitherto to produce deep dyeings on acid-modified polyester fiber which are at the same time also fast to washing and to light. Thus, the use of disperse dyes in proper amount may yield a deep dyeing on the mentioned fiber, but the dyeing is fugitive to washing. The use of cationic dyes (basic dyes) in general, will overcome the washing sensitiveness, but the dyeings as a rule are not fast to light.

I have now found that by using a particular class of cationic dyes as more fully defined below, deep dyeings fast to both light and washing may be produced on acid-modified polyester fiber. This effect is particularly surprising when it is considered that when applied to other hydrophobic synthetic fiber, for instance acid-modified acrylic fiber, the same dyes give dyeings of but moderate strength and do not show in this respect any outstanding difference compared to other known cationic dyes.

The particular class of cationic dyes which form the central theme of this invention may be designated generically as safranine-azo dyes which are free of ionizable acid substituents, and may be expressed by the general formula

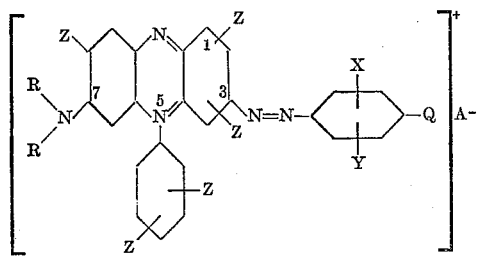

In this formula, Z is hydrogen or methyl, R is hydrogen or lower alkyl, X is hydrogen, methyl or methoxy, Y is hydrogen, chlorine, methyl or methoxy, Q is a member of the group consisting of the hydroxyl radical and primary, secondary and tertiary amino radicals, and A⁻ is a water-solubilizing anion.

The majority of the colors in this group are known and may be synthesized by known methods. See for instance, British patent No. 283,777, accepted January 19, 1928, or U.S.P. 2,554,443. To this general group belong safranine-azo dyes of the above general formula wherein Q stands for OH, NH₂, monoalkylamino, dialkylamino, mono-2-hydroxyethylamino, bis-2-hydroxyethylamino, mono - 2 - hydroxyethyl - monoalkylamino, mono - 2-chloroethylmonoalkylamino, bis - 2 - chloroethylamino, morpholino and piperidino (all alkyls mentioned being lower alkyl radicals, that is, having from 1 to 4 C-atoms).

A special subgroup under the above general formula is constituted by those dyes wherein Q is an amino group bearing at least one 2-cyanoethyl radical. These are novel compounds and are disclosed more fully and claimed in my copending U.S. application Serial No. 32,149, filed May 27, 1960.

The actual procedure of applying safranine-azo dyes to acid-modified polyester fiber does not differ much from known procedure, and may include dyeing (from an aqueous bath, at or near the boil) in the presence of a non-ionic carrier, dyeing in the presence of an anionic carrier, or dyeing at high temperature, say 250° F. (from an aqueous bath under pressure), in the absence of carriers.

The strength of the dyebath may vary, as is customary, from ¼ to 2% O.W.F. (on weight of fiber), depending on the amount of dye that is desired to deposit on the fiber, but in each instance the strength of dyeing obtained is several fold (perhaps 2 to 4 times) that obtainable from an equal bath concentration of the same dye when dyed on acid-modified acrylic fiber.

Without limiting this invention, the following examples are given to illustrate my preferred mode of operation. Parts mentioned are by weight.

EXAMPLE 1

*Dyeing in Presence of Non-Ionic Carrier*

| | Parts |
|---|---|
| A dyebath is prepared by mixing | |
| The azo dye obtained by coupling diazotized 3-amino-7-diethylamino-5-phenylphenazinium chloride to phenol (see Example 6 below) | 1.0 |
| Glacial acetic acid | 1.0 |
| Non-ionic surfactant (e.g. the condensation product of one mole of oleyl alcohol with 20 moles of ethylene oxide) | 1.2 |
| Dimethylterephthalate | 0.8 |
| Benzanilide | 0.8 |

Water to make a total of 4000 parts.

100 parts of a fabric consisting of acid-modified polyester fiber are entered into the dyebath (having a pH about 5) and the bath temperature is raised to 212° F. and maintained for 2 hours. At the end of this time the cloth is removed, rinsed in water, and scoured for 15 minutes at 200° F. with 0.3 part of the sodium salt of the sulfate of the condensation product of ethylene oxide and oleyl alcohol (20 moles:1 mole) dissolved in 4000 parts of water. The fabric is then removed from the scour bath, rinsed in water, and dried.

The fabric thus obtained is dyed a light-fast and wash-fast navy blue shade, the strength of dyeing being impressively greater than obtainable by a 1% dyeing O.W.F. with the same dye on acid-modified acrylic fiber.

Optionally, the above dyeing may be performed in the presence of 0.7 part of an anionic retarder, such as the condensation product of formaldehyde and 2-naphthalenesulfonic acid, or in the presence of a cationic retarder, such as a long chain alkyl quaternary ammonium compound, in order to regulate the rate of dyeing which in turn affects the levelness of shade obtained.

EXAMPLE 2

*Dyeing in Presence of Anionic Carrier*

The reagents and procedure are as in Example 1 except that the dimethylterephthalate and benzanilide are replaced by 2 parts of o-phenylphenol and sufficient acetic acid is used to maintain the pH at about 5. The results are essentially the same as in Example 1.

EXAMPLE 3

*Pressure Dyeing Procedure (Without Carrier)*

The pressure vessel employed for this procedure is a stainless steel dyeing machine such as those commonly used in the trade for package, rawstock or beam dyeing operations.

100 parts of acid-modified polyester fiber rawstock are placed in a stainless steel pressure dyeing machine and scoured by heating for 20 minutes at 180° F. in 2000 parts of water containing 0.5 part of tetrasodium pyrophosphate and 0.6 part of a non-ionic surfactant, e.g. the condensation product of 20 moles of ethylene oxide with 1 mole of oleyl alcohol. The scouring liquor is drained off and the polyester fiber rawstock is rinsed with water.

To 1800 parts of water in said dyeing machine are added 1.2 parts of the above named surfactant and 0.25 part of sodium dichromate ($Na_2Cr_2O_7 \cdot 2H_2O$), followed by a dye solution which has been prepared as follows:

2 parts of the monoazo dye obtained by diazotizing 3,7 - diamino-2,8-dimethyl-5-phenylphenazinium chloride and coupling to m-toluidine are pasted with 2 parts of glacial acetic acid and diluted with 200 parts of water, the pH being adjusted to 5 by addition of sodium carbonate. The dyebath is then heated to 200° F. and 12 parts of anhydrous sodium sulfate are added. The dyeing machine, now nearly filled, is closed and the contents are heated at 250° F. for approximately 2 hours, developing a pressure of about 15 p.s.i.g. The dyebath is then cooled to 190° to 200° F., the dye liquor is drawn off, the dyed material is rinsed with water and scoured by heating at 180° F. for 20 minutes in 2000 parts of water containing 0.6 part of the above named surfactant and 1 part of acetic acid. The dyed material is again rinsed with water, and dried.

A very strong dyeing of violet shade is obtained of good fastness to light and to washing.

Other forms of acid-modified polyester fiber, such as tow and top, are conveniently dyed by the above described procedure.

In a modification of this procedure the dyebath contains also 0.7 part of an anionic additive, e.g. the condensation product of formaldehyde with 2-naphthalenesulfonic acid.

In a manner similar to any of the foregoing examples, numerous other dyes of the safranine-azo class may be applied to acid-modified polyester fibers, giving unusually strong dyeings in each case. This statement applies to any of the variations in Q discussed in the general introduction above. Tables I and II below give further particular illustrations and indicate the shades obtained.

TABLE I

Diazo compound derived from—
A. 3,7 - diamino-2,8-dimethyl-5-phenylphenazinium chloride (C.I. No. 50240)
B. 3-amino-7-diethylamino - 5 - phenylphenazinium chloride (C.I. No. 50206)
C. 3 - amino-7-diethylamino-5-phenylphenazinium chloride (C.I. No. 50205)
D. 3 - amino - 2 - methyl-7-diethylamino-5-phenylphenazinium chloride (C.I. No. 50216)
E. 3-amino - 1,4 - dimethyl-7-dimethylamino-5-(2,4-dimethylphenyl)-phenazinium chloride (C.I. No. 50260)

TABLE II

| Diazo Component | Coupler | Shade on acid-modified polyester fiber |
|---|---|---|
| A | N,N-dimethylaniline | green-blue. |
| A | N,N-diethylaniline | Do. |
| A | 2-amino-4-methyl-anisole | blue. |
| A | N,N-diethyl-m-toluidine | green. |
| A | N-ethyl-N-2-hydroxyethyl-m-toluidine | blue-green. |
| A | N,N-bis-2-hydroxyethylaniline | blue. |
| A | N-2-cyanoethyl-N-hydroxyethyl-aniline | Do. |
| A | N-2-cyanoethyl-N-ethyl-m-toluidine | green-blue. |
| A | N-2-cyanoethyl-N-methylaniline | blue. |
| A | N,N-bis-2-cyanoethyl-m-toluidine | Do. |
| A | m-Cresol | red-navy. |
| A | Phenol | Do. |
| B | m-Methoxyphenol | blue. |
| B | m-Toulidine | violet. |
| B | 2,5-dimethyloxyaniline | blue. |
| B | o-Chloro-N-2-cyanoethylaniline | Do. |
| B | N-2-cyanoethylaniline | Do. |
| B | N-2-chloroethyl-N-ethyl-m-toluidine | green-blue. |
| B | m-Cresol | navy. |
| B | Phenol | Do. |
| C | N-2-cyanoethyl-N-ethylaniline | blue. |
| C | N,N-diethyl-m-toluidine | green. |
| C | m-Cresol | navy. |
| C | Phenol | Do. |
| D | N,N-bis-2-hydroxyethylaniline | green-blue. |
| D | m-Cresol | red-navy. |
| D | Phenol | Do. |
| E | m-Cresol | Do. |

The following additional examples illustrate the methods generally used in the synthesis of the dyes employed in this invention.

EXAMPLE 4

21 parts of 3,7-diamino-2,8-dimethyl-5-phenylphenazinium chloride (C.I. No. 50240) are suspended in 1100 parts of water and heated to 90° C. for 30 minutes. The solution is cooled by the addition of 900 parts of ice and diazotized at 10° to 15° C. by adding 32 parts of 2 N sodium nitrite solution and 37 parts of 20% hydrochloric acid. After diazotization is complete the excess nitrous acid is destroyed with sulfamic acid. 24 parts of sodium acetate dissolved in 40 parts of water are then added, followed at once by 9.6 parts of N-2-cyanoethyl-N-methylaniline dissolved in a mixture of 48 parts of ethanol and 17 parts of 20% hydrochloric acid. The mixture is agitated for 16 hours and then heated to 60° C. 13.5 parts of 47% zinc chloride are added followed by 50 parts of sodium chloride. The product is then filtered off and washed with 5% brine to yield a dye having the following structure:

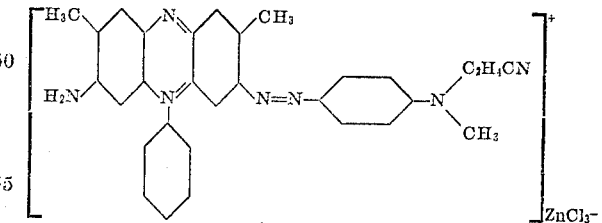

EXAMPLE 5

The procedure is the same as in Example 4 except that in lieu of 9.6 parts of N-2-cyanoethyl-N-methylaniline, 9.8 parts of N,N-diethyl-m-toluidine are used here.

EXAMPLE 6

Diazotize 22.6 parts of 3-amino-7-diethylamino-5-phenylphenazinium chloride in usual manner, using sodium nitrite and hydrochloric acid. Add to the diazo mixture a solution comprising 5.65 parts of phenol dissolved in 20 parts of water containing sodium hydroxide. Add 16% sodium carbonate solution until the pH is 7.5. After 1 hour, add 30 parts of 15% hydrochloric acid and leave for a further hour; then add 9 parts of zinc chloride and 140 parts of sodium chloride to precipitate the product, which is then filtered off and dried.

It will be understood, that the details of the above examples may be varied widely within the skill of those engaged in this art. For instance—

In the synthesis procedures, instead of diazotizing in the presence of hydrochloric acid, one may employ other acids, for instance sulfuric or phosphoric. In the isolation step, the addition of zinc chloride is optional. As a consequence of these two factors, the $A^-$ in the above general formula may represent any convenient water-solubilizing anion, such as chloride, bromide, sulfate, phosphate or $ZnCl_3^-$.

In the dyeing procedures, other colors may be admixed in the dyebath to produce blacks or various other shading effects.

The dyes specified in this invention generally exhibit remarkable light stability in the presence of residual amounts of carrier. However, in order to achieve maximum light fastness, the dyed goods may be heated for 1 minute at 375° F. to remove any residual carrier.

I claim as my invention:

1. A composition comprising acid-modified polyester fiber dyed with a dye of the formula

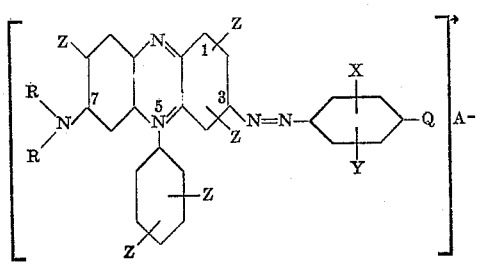

wherein Z is a member of the group consisting of hydrogen and methyl, R is a member of the group consisting of hydrogen and lower alkyl, X is a member of the group consisting of hydrogen, methyl and methoxy, Y is a member of the group consisting of hydrogen, chlorine, methyl and methoxy, Q is a member of the group consisting of the hydroxyl radical and primary, secondary and tertiary amino radicals, and $A^-$ is a water-solubilizing anion.

2. Acid-modified polyester fiber dyed with a dye as formulated in claim 1, Q being the radical OH.

3. Acid-modified polyester fiber dyed with a dye as formulated in claim 1, Q being a dialkylamino radical.

4. Acid-modified polyester fiber dyed with a dye as formulated in claim 1, Q being an amino group containing at least one 2-hydroxyethyl radical.

5. Acid-modified polyester fiber dyed with a dye as formulated in claim 1, Q being an amino group containing at least one 2-cyanoethyl radical.

References Cited in the file of this patent

UNITED STATES PATENTS

| | | |
|---|---|---|
| 2,554,443 | Hayden | May 22, 1951 |
| 2,883,373 | Bossard et al. | Apr. 21, 1959 |
| 2,893,816 | Tsang et al. | July 7, 1959 |

FOREIGN PATENTS

| | | |
|---|---|---|
| 283,777 | Great Britain | Jan. 19, 1928 |
| 826,248 | Great Britain | Dec. 31, 1959 |